United States Patent
Herold

(10) Patent No.: US 11,837,419 B2
(45) Date of Patent: Dec. 5, 2023

(54) CAM DISK CONTOURS WITHIN AN ON-LOAD TAP CHANGER

(71) Applicant: Maschinenfabrik Reinhausen GmbH, Regensburg (DE)

(72) Inventor: Stefan Herold, Munich (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 405 days.

(21) Appl. No.: 17/312,008

(22) PCT Filed: Nov. 14, 2019

(86) PCT No.: PCT/EP2019/081287
§ 371 (c)(1),
(2) Date: Jun. 9, 2021

(87) PCT Pub. No.: WO2020/120062
PCT Pub. Date: Jun. 18, 2020

(65) Prior Publication Data
US 2022/0059298 A1    Feb. 24, 2022

(30) Foreign Application Priority Data
Dec. 13, 2018  (DE) .................... 10 2018 132 027.2

(51) Int. Cl.
*F16H 33/04* (2006.01)
*H01H 9/00* (2006.01)
(Continued)

(52) U.S. Cl.
CPC ............... *H01H 3/40* (2013.01); *F16H 33/04* (2013.01); *H01H 3/42* (2013.01); *H01H 9/0005* (2013.01)

(58) Field of Classification Search
CPC .................... H01H 3/40; H01H 3/42–9/0005
See application file for complete search history.

(56) References Cited

U.S. PATENT DOCUMENTS

| 2,114,143 A | 4/1938 | Hunter |
| 4,649,244 A * | 3/1987 | Baginski .................. H01H 3/30 200/325 |

(Continued)

FOREIGN PATENT DOCUMENTS

| DE | 102005027527 B3 | 8/2006 |
| DE | 102014107722 B3 | 9/2015 |
| WO | 2016146387 A1 | 9/2016 |

*Primary Examiner* — Vanessa Girardi
(74) *Attorney, Agent, or Firm* — LEYDIG, VOIT & MAYER, LTD.

(57) ABSTRACT

An on-load tap-changer has a transmission, a motor with an output shaft, and a diverter switch with a drive shaft. The transmission has a cam disk; a drive gear wheel; and a roller coupled to the drive gear wheel. The cam disk is connected the output shaft, which lies on a rotation axis of the cam disk. The drive gear wheel is connected to the drive shaft. The cam disk has an inner and outer contour, which are followed by the roller, and which each have a first region with a constant radius of curvature and a second region in which a distance of a respective contour from the rotation axis of the cam disk changes. During a rotational movement of the cam disk, the roller follows the first region of the outer contour, the second region of the outer contour, and then the first region of the inner contour.

12 Claims, 4 Drawing Sheets

(51) Int. Cl.
*H01H 3/40* (2006.01)
*H01H 3/42* (2006.01)

(56) References Cited

U.S. PATENT DOCUMENTS

| | | | | |
|---|---|---|---|---|
| 5,541,378 A | * | 7/1996 | Niklaus | ................ H01H 3/3026 74/567 |
| 2009/0288934 A1 | | 11/2009 | Hoepfl et al. | |
| 2018/0040434 A1 | | 2/2018 | Hoepel et al. | |

* cited by examiner

CAM DISK CONTOURS WITHIN AN ON-LOAD TAP CHANGER

CROSS REFERENCE TO RELATED APPLICATIONS

This application is a U.S. National Phase application under 35 U.S.C. § 371 of International Application No. PCT/EP2019/081287 (WO 2020/120062 A1), filed on Nov. 14, 2019, and claims benefit to German Patent Application No. DE 10 2018 132 027.2, filed on Dec. 13, 2018.

FIELD

The invention relates to a transmission for an on-load tap-changer, and also to a corresponding on-load tap-changer comprising the transmission.

BACKGROUND

On-load tap-changers are used for changing over between winding taps of a transformer without interruption. On-load tap-changers usually consist of a selector for power-free selection of the respective winding tap of the transformer to which a changeover is intended to be made and a diverter switch for actually changing over from the previous winding tap to the new, preselected winding tap. An energy accumulator, often also called a force accumulator, is usually used here to convert a continuous, slow rotational movement of the output shaft. The output shaft is driven by a motor at a constant rotation speed, into an abrupt, rapid rotational movement of the drive shaft. The drive shaft drives the diverter switch. Energy accumulators generally allow for the abrupt rotational movement of the drive shaft with the aid of an accumulator spring. The principle here is always the same: the output shaft, which is driven by the motor at a constant rotation speed, tensions the accumulator spring up to a maximum point and, after this maximum point is exceeded, the accumulator spring suddenly relaxes, and as a result, abruptly drives the drive shaft.

Furthermore, energy accumulators generally have couplings by means of which the selector movement is decoupled from the diverter switch operation. These couplings, also called freewheels, just like the accumulator spring, have the effect that the changeover process, once it has been started, can no longer be interrupted in the event of a fault, that is to say the on-load tap-changer can no longer be moved back to its starting position.

The design of an energy accumulator with a spring is extremely complex since it consists of a large number of individual components that have to interact in the correct way. This makes such energy accumulators costly and susceptible to faults.

SUMMARY

In an embodiment, the present disclosure provides a transmission for an on-load tap-changer having a motor with an output shaft and a diverter switch with a drive shaft. The transmission has: a cam disk; a drive gear wheel; and a roller, which is coupled to the drive gear wheel. The cam disk is connected in a rotationally fixed manner to the output shaft and the output shaft lies on a rotation axis of the cam disk. The drive gear wheel is connected in a rotationally fixed manner to the drive shaft. The cam disk has an inner contour and an outer contour, the inner contour and the outer contour being configured to be followed by the roller. The inner contour and the outer contour each have a first region with a constant radius of curvature and a second region in which a distance of a respective contour from the rotation axis of the cam disk changes. The roller is configured such that, in an event of a rotational movement of the cam disk, the roller follows the inner contour and the outer contour in such a way that the roller follows a portion of the first region of the outer contour, thereafter follows a portion of the second region of the outer contour and thereafter follows a portion of the first region of the inner contour.

BRIEF DESCRIPTION OF THE DRAWINGS

Subject matter of the present disclosure will be described in even greater detail below based on the exemplary figures. The invention defined by the following claims is not limited to the exemplary embodiments. All features described and/or illustrated herein can be used alone or combined in different combinations. The features and advantages of various embodiments will become apparent by reading the following detailed description with reference to the attached drawings, which illustrate the following:

DETAILED DESCRIPTION

Figure 1:
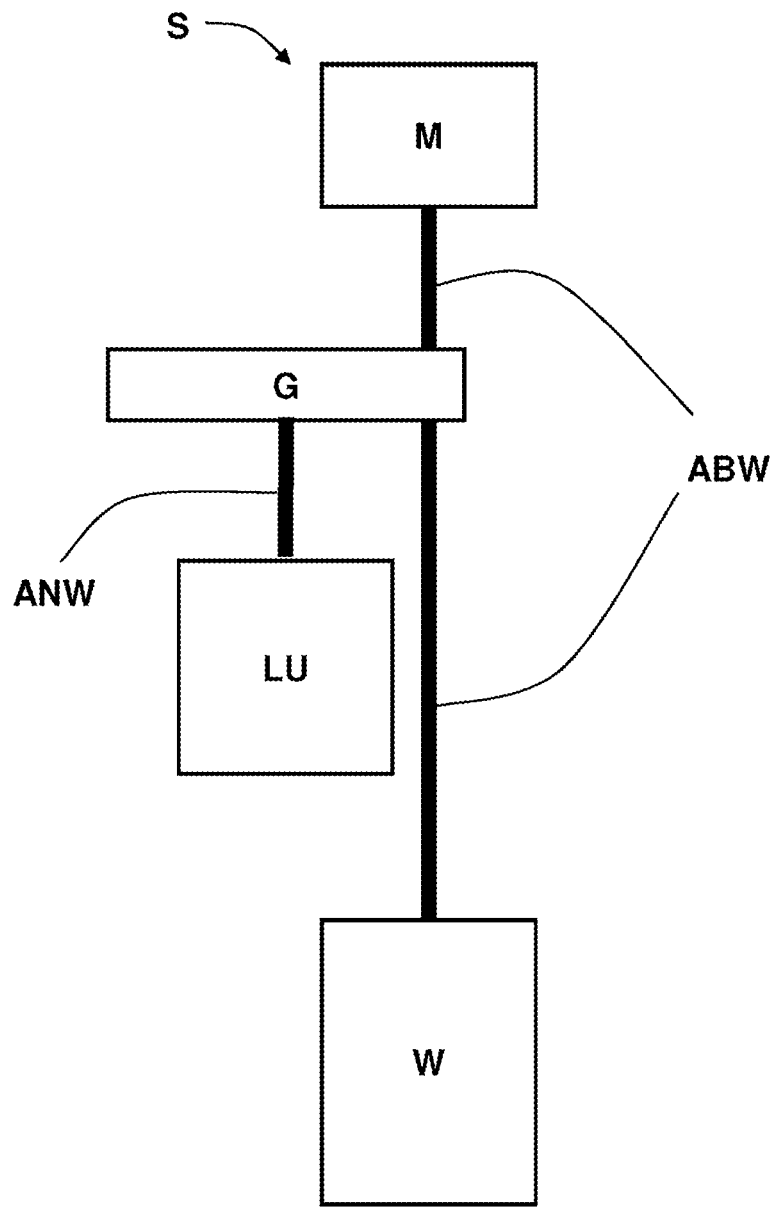
FIG. 1 shows a schematic design of an exemplary embodiment of an on-load tap-changer comprising a transmission.

Embodiments of the invention provide an improved transmission in an on-load tap-changer. The transmission is cost-effective and allows more simple operation of the on-load tap-changer and increased safety during operation.

According to an improved concept, a transmission for an on-load tap-changer is provided. The tap changer has a motor with an output shaft and has a diverter switch with a drive shaft, and the transmission comprises a cam disk, a drive gear wheel and a roller which is coupled to the drive gear wheel. Here, the cam disk is connected in a rotationally fixed manner to the output shaft and the drive gear wheel is connected in a rotationally fixed manner to the drive shaft. The output shaft lies on a rotation axis of the cam disk. The cam disk has an inner contour and an outer contour, which inner contour and outer contour can be followed by the roller. The inner and the outer contour each have a first region with a constant radius of curvature with respect to the rotation axis, and each have a second region in which the distance of the respective contour from the rotation axis of the cam disk changes, for example decreases or increases. Here, the roller, in the event of a rotational movement of the cam disk, follows the contours in such a way that the roller follows a portion of the first region of the outer contour, immediately thereafter a portion of the second region of the outer contour and immediately thereafter, independently of a possible change in direction of the rotational movement of the cam disk, a portion of the first region of the inner contour.

The configuration and, in particular, the regions of the contours of the cam disk have the effect that, during a tap-change process of the on-load tap-changer, the selector is initially moved at a constant rotation speed and subsequently the diverter switch is operated more rapidly, in particular abruptly, without freewheels for decoupling and an accumulator spring for operating the diverter switch being required in the process. This has the advantage that a reversal in direction during the tap-change process is generally possible. A reversal in direction or a termination of the tap-change process accompanied by the selector or diverter switch returning to the starting position may be required, for example, when a monitoring device detects in the on-load tap-changer a fault which means that the on-load tap-changer is not functioning properly, for example an increased torque at the drive shaft and/or output shaft, or other faults recorded by sensor systems in the on-load tap-changer. It may then be safer to terminate the tap-change process, depending on the respective fault situation.

An additional advantage of the transmission according to the improved concept is that it has fewer components and therefore can be operated more simply and more safely.

According to at least one embodiment, the roller, in the event of a rotational movement of the cam disk, follows the contours in such a way that the roller follows a portion of the first region of the inner contour, immediately thereafter a portion of the second region of the inner contour and immediately thereafter, independently of a possible change in direction of the rotational movement of the cam disk, a portion of the first region of the outer contour.

According to at least one embodiment, the portion of the first region of the inner contour and/or the portion of the first region of the outer contour are/is arranged between the second region of the inner contour and the second region of the outer contour.

According to at least one embodiment, the roller, when it moves from the second region of the inner contour to the second region of the outer contour, and vice versa, has to move either over a portion of the first region of the inner contour or over a portion of the first region of the outer contour.

According to at least one embodiment, the second region of the inner contour is situated opposite the second region of the outer contour.

According to at least one embodiment, the transmission is designed in such a way that the drive gear wheel is operated for a switching process of the diverter switch.

According to at least one embodiment, the drive gear wheel is not moved while the roller is following the portion of the first region of one of the contours. In particular, the selector is moved at a constant speed while the roller is following the portion of the first region of one of the contours and, in particular, the diverter switch is not moved during the selector movement.

According to at least one embodiment, the drive gear wheel is moved while the roller is following the portion of the second region of one of the contours. In particular, the diverter switch is moved rapidly and abruptly while the roller is following the portion of the second region of one of the contours and, in particular, the selector is not moved during the diverter switch movement.

According to at least one embodiment, the roller is arranged on a toothed element, preferably a gear wheel segment, which is operatively connected to the drive gear wheel.

According to at least one embodiment, the transmission comprises a locking mechanism which is designed in such a way that it, after operation of the drive gear wheel, prevents the drive gear wheel from being moved further.

According to at least one embodiment, the locking mechanism is designed in such a way that it, after a tap-change process of the on-load tap-changer, prevents the switching unit of the diverter switch, which switching unit is coupled to the drive gear wheel, from being moved further.

The locking mechanism ensures that the on-load tap-changer, after a changeover process, maintains the new position and the electrical clearances between the contacts as operation continues, this contributing to a longer service life of the switching unit and therefore of the entire on-load tap-changer in the long term.

According to at least one embodiment, the transmission comprises a release mechanism which is designed in such a way that it, before operation of the drive gear wheel, releases the locking mechanism, so that the drive gear wheel can be moved.

According to at least one embodiment, the release mechanism is designed in such a way that, during a tap-change process of the on-load tap-changer, the switching unit of the diverter switch can be operated.

According to at least one embodiment, the cam disk has a third contour in which at least one follower runs. The third contour has a first region with a constant radius of curvature with respect to the rotation axis and has a second region in which the distance from the rotation axis of the cam disk changes, for example increases and/or decreases. The at least one follower can follow the first region and the second region of the third contour.

According to at least one embodiment, the at least one follower interacts with the locking and/or release mechanism in such a way that the locking mechanism is released while the at least one follower is following a portion of the first region of the third curve and the locking mechanism is activated while the at least one follower is following the second region of the third curve.

For example, the locking mechanism can be released at any time at which the at least one follower is in the first region.

For example, the locking mechanism can be activated at any time at which the at least one follower is in the second region.

For example, the locking mechanism can be released at any time at which the at least one follower is in the second region.

According to at least one embodiment, the locking and/or release mechanism comprises at least one locking pawl, which is connected to the at least one follower, and comprises at least one projection which is arranged on the drive gear wheel.

According to at least one embodiment, the locking mechanism is activated by way of the at least one locking pawl latching into the at least one projection.

According to at least one embodiment, the locking mechanism is released by way of the at least one locking pawl being released from the at least one projection.

According to at least one embodiment, the transmission comprises a monitoring device for determining a position, in particular an absolute position, of the drive shaft, of the output shaft or of a further shaft coupled to the transmission. The monitoring device can comprise, for example, a position transmitter, in particular an absolute value transmitter.

If a fault occurs, in particular during operation of the diverter switch, the monitoring device and, respectively, a shaft position determined by it can be used to make a decision, on the basis of the position, as to whether the switching process should be ended, or the on-load tap-changer should be stopped and/or returned to its starting position.

According to an improved concept, an on-load tap-changer is also provided. The on-load tap-changer comprises a motor with an output shaft, a diverter switch with a drive shaft, and a transmission according to the improved concept.

The explanations relating to the transmission according to the improved concept, in particular those relating to the individual features, accordingly apply analogously to the on-load tap-changer according to the improved concept, and vice versa.

The invention will be explained in detail below using exemplary embodiments with reference to the drawings. Components which are functionally identical or have an identical effect can be provided with identical reference signs. In some circumstances, identical components or components with an identical function are explained only with reference to the figure in which they appear for the first time. The explanation is not necessarily repeated in the following figures.

FIG. 1 schematically shows an exemplary embodiment of an on-load tap-changer S, which comprises, by way of example, a motor M with an output shaft ABW, a diverter switch LU with a drive shaft ANW, a selector W, and a transmission G. The selector W comprises a plurality of fixed contacts and two moving contacts, and is coupled to the output shaft ABW for driving the moving contacts. The diverter switch LU comprises a moving contact unit for diverter switch operation and is coupled to the drive shaft ANW for driving the contact unit. The drive shaft ANW is coupled via the transmission G to the output shaft ABW, which the motor M drives, for example, at a constant rotation speed, during a tap-change process of the on-load tap-changer S.

Figure 2:
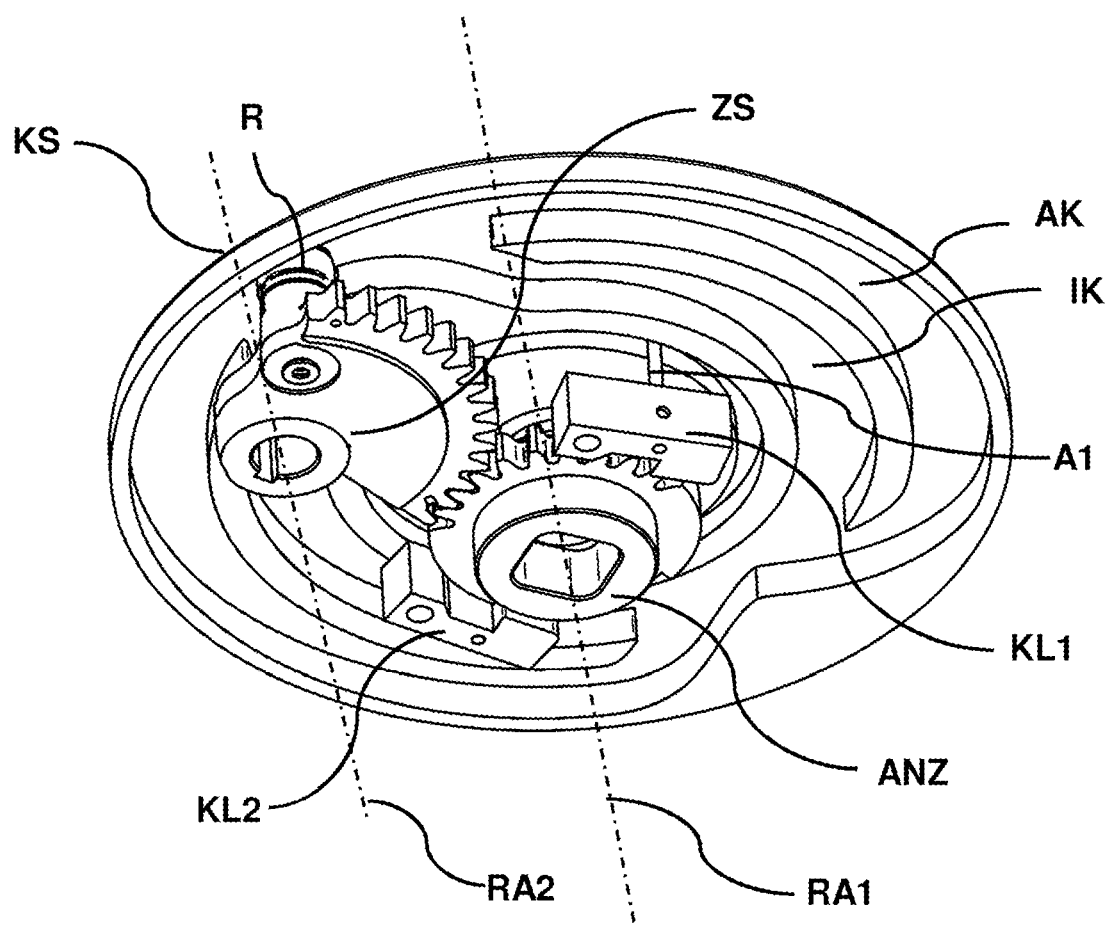
FIG. 2 shows an exemplary embodiment of a transmission.
Figure 4:
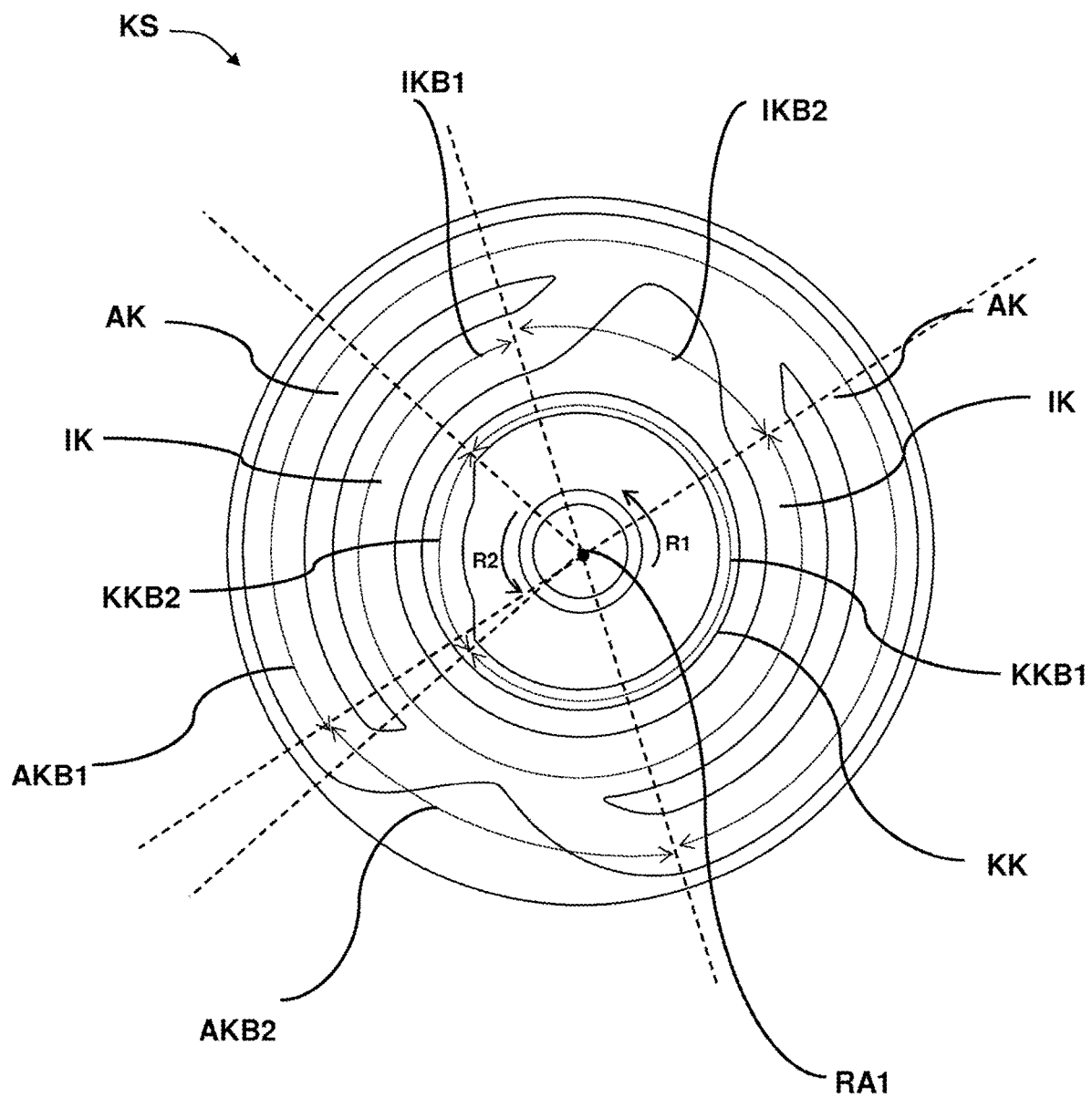
FIG. 4 shows an exemplary embodiment of a cam disk of a transmission.

FIG. 2 shows an exemplary embodiment of a transmission G according to the improved concept. The transmission G comprises a cam disk KS, a drive gear wheel ANZ and a roller R, which is coupled to the drive gear wheel ANZ. The cam disk KS is connected in a rotationally fixed manner to the output shaft ABW and is driven by the motor M via the output shaft ABW. Here, the cam disk KS rotates about a rotation axis RA1 on which the output shaft ABW lies. The drive gear wheel ANZ is connected in a rotationally fixed manner to the drive shaft ANW, and therefore drives the contact unit of the diverter switch LU. The roller R is fitted to a gear wheel segment ZS which is operatively connected to the drive gear wheel ANZ and is moved alternately from one direction of rotation to the other about an axis RA2 for each switching process of the diverter switch LU. The cam disk KS has an inner contour IK and an outer contour AK, which inner contour and outer contour each comprise different regions, which are shown using dashed lines in FIG. 4. However, other definitions for the regions are also conceivable, provided that the function of the individual regions, which function will be explained below, it still fulfilled. The two contours IK and AK each have a first region IKB1 and AKB1 in which the radius of curvature of the contours with respect to the rotation axis RA1 is constant and each have a second region IKB2 and AKB2 in which the distance of the contours IK and AK from the rotation axis RA1 changes. For example, in the second region of the inner contour IKB2, the distance is initially relatively large and then becomes smaller again, and, in the second region of the outer contour AKBZ, the distance is initially relatively small and then becomes larger again. Furthermore, the cam disk KS has a third contour KK which likewise comprises a first region KKB1 and a second region KKB2, wherein the first region KKB1 has a constant radius of curvature with respect to the rotation axis RA1 and, in the second region KKB2, the distance of the contour from the rotation axis RA1 changes, for example initially decreases, then increases and thereafter decreases again, as shown in FIG. 4.

The operating principle of the transmission G is as follows: during a tap-change process of the tap changer S, the output shaft ABW is operated by the motor M, for example at a constant rotation speed, and sets the cam disk KS in rotation with it. During the rotation of the cam disk KS about the rotation axis RA1, the roller R follows the contours. For example, the roller R, in the event of a rotation in a direction R1, initially follows a portion of the first region of the outer contour AKB1, in which portion the contour has a constant radius of curvature. At the same time, at least one moving contact of the selector W follows the new winding tap, to be connected up, of the transformer without load. Thereafter, the roller R enters the second region of the outer contour AKB2, wherein the selector movement is now completed. In this region, the distance of the outer contour AK from the rotation axis RA1 initially decreases, so that the distance of the roller R from the rotation axis RA1 likewise decreases. As a result, the gear wheel segment ZS rotates more rapidly, in particular abruptly, about the axis RA2 in comparison to the previous, slow selector movement. This movement is transmitted via toothing systems directly to the drive gear wheel ANZ and therefore to the drive shaft ANW. By virtue of the operation of the drive shaft ANW, the contact unit of the diverter switch LU is finally also abruptly operated. Therefore, independent operation initially of the selector W and subsequently of the diverter switch LU is implemented by the individual regions of the contour which the roller R follows.

If a new switching process is initiated thereafter by the operation of the motor M, the roller R initially follows the inner contour IK during the selector movement, irrespective of whether the cam disk KS is moved in direction R1 or R2, before entering the second region of the inner contour IKB2 in which operation of the diverter switch LU takes place once again.

In the case of another new switching process, the roller R then follows the outer contour AK again.

Figure 3:
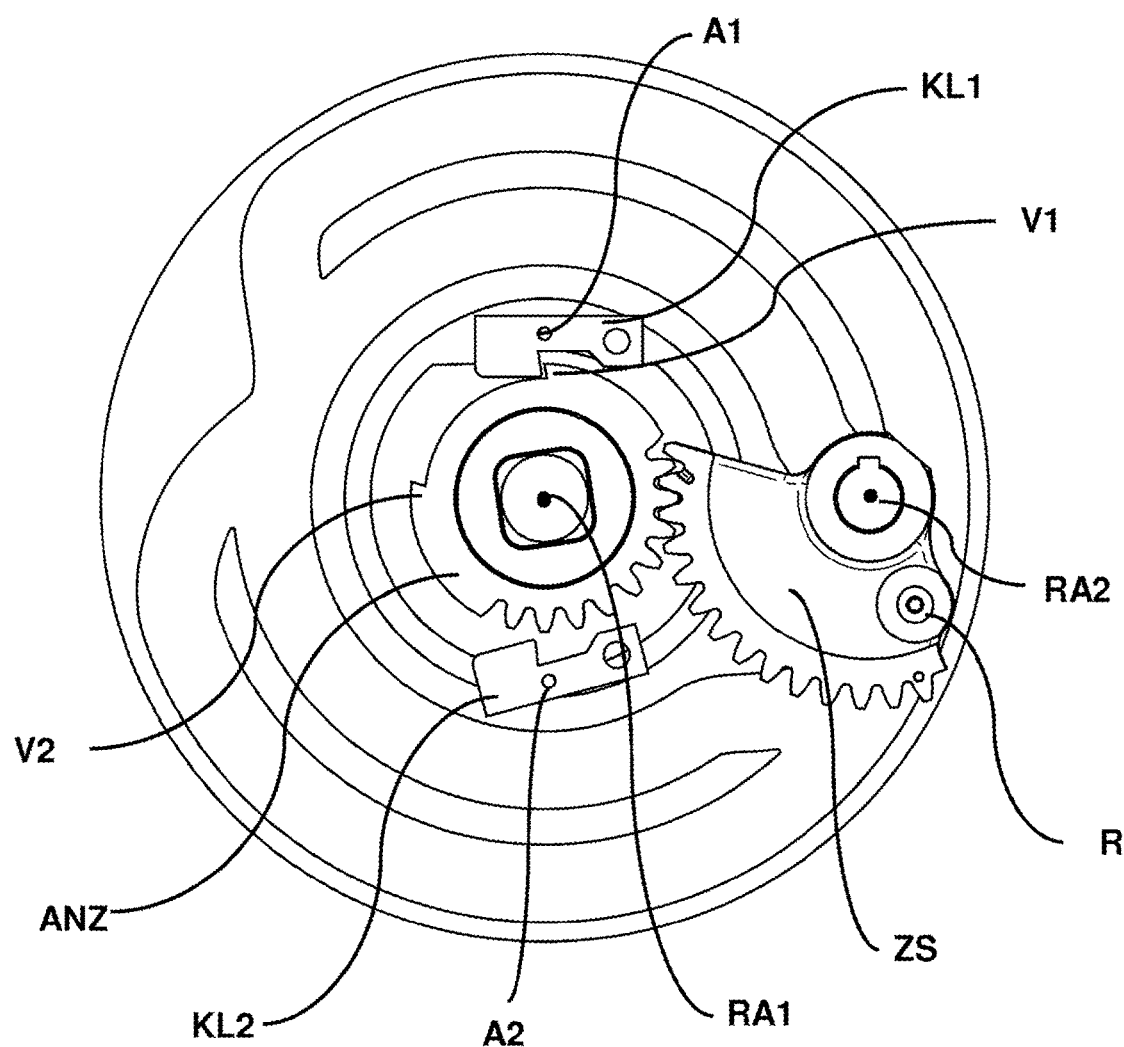
FIG. 3 shows a further view of the exemplary embodiment from FIG. 2.

Furthermore, the transmission has a locking or release mechanism which is shown in FIGS. 2 and 3. The locking or release mechanism comprises two locking pawls KL1 and KL2, each having a follower A1 and A2 which follows the third contour KK of the cam disk KS. The followers A1, A2 can be designed, for example, in a rod-like manner. The two locking pawls KL1 and KL2 interact with two projections V1 and V2 which are provided on the drive gear wheel ANZ. If one of the locking pawls KL1 or KL2 is located, for example, on one of the projections V1 or V2, that is to say is in a latched-in state, the drive gear wheel ANZ cannot be moved and the locking mechanism is active.

The manner of operation of the locking and release mechanism is as follows: at the beginning of a tap-change process, in which the cam disk KS is moved in direction of rotation R1 for example, the first follower A1 initially follows a portion of the second region of the third contour KK. In this region, the first locking pawl KL1 is in the latched-in state on the first projection V1. In this state, the locking mechanism is active, so that the drive gear wheel ANZ cannot be moved. In the event of further rotation of the cam disk KS, the first follower A1 enters the first region of the third contour KKB1. As a result, the first locking pawl KL1 is released from the first projection V1 and the drive gear wheel ANZ can be moved. In the further course of the rotational movement of the cam disk KS, the second follower A2 enters the second region of the third contour KKB2. Since the distance of the contour from the rotation axis RA1 changes, in particular decreases here, the follower A2 is likewise moved closer to the rotation axis RA1, as is, together with it, the locking pawl KL2 which thereafter latches into the second projection V2. Here, the locking pawls KL1 and KL2 with the two followers A1 and A2, the projections V1 and V2 and also the regions of the third contour KKB1 and KKB2 are arranged and configured and interact in such a way that, before a diverter switch operation, the two locking pawls are released or will be released, so that the drive gear wheel ANZ can be moved and that, immediately after a diverter switch operation, one of the two locking pawls latches in on one of the two projections, so that it is ensured that the drive gear wheel ANZ cannot be moved further after operation.

The transmission according to the improved concept achieves the stated object and, in particular, the configuration of the contours of the cam disk ensures that the selector is moved in the first region of the contours and the switching unit of the diverter switch is operated in the second region of the contours in each case. In this way, the functional principle of energy accumulators, according to which the operation of the diverter switch takes place suddenly and in a decoupled manner following the selector movement, is realized and, at the same time, the disadvantage exhibited by the known energy accumulators, specifically that reversal of the switching process is no longer possible in the event of a fault on account of freewheels and the spring, is avoided. This is because, according to the transmission according to the improved concept, a reversal in direction or a termination of the switching process accompanied by the selector or diverter switch returning to the starting position is possible substantially at any time in the tap-change process.

While subject matter of the present disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the invention defined by the following claims may cover further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

S Tap changer
M Motor
ABW Output shaft
ANW Drive shaft
G Transmission
LU Diverter switch
W Selector
KS Cam disk
R Roller
ANZ Drive gear wheel
AK Outer contour
IK Inner contour
KK Third contour
RA1, RA2 Rotation axis
ZS Toothed element
A1, A2 Follower
KL1, KL2 Locking pawl
V1, V2 Projection
AKB1 First region of the outer contour
AKB2 Second region of the outer contour
IKB1 First region of the inner contour
IKB2 Second region of the inner contour
KKB1 First region of the third contour
KKB2 Second region of the third contour

The invention claimed is:

1. A transmission for an on-load tap-changer, the on-load tap-changer comprising a motor with an output shaft and a diverter switch with a drive shaft, the transmission comprising:
   a cam disk;
   a drive gear wheel; and
   a roller, which is coupled to the drive gear wheel,
   wherein the cam disk is connected in a rotationally fixed manner to the output shaft and the output shaft lies on a rotation axis of the cam disk,
   wherein the drive gear wheel is connected in a rotationally fixed manner to the drive shaft,
   wherein the cam disk has an inner contour and an outer contour, the inner contour and the outer contour being configured to be followed by the roller,
   wherein the inner contour and the outer contour each have a first region with a constant radius of curvature and a second region in which a distance of a respective contour from the rotation axis of the cam disk changes, and
   wherein the roller is configured such that, in an event of a rotational movement of the cam disk, the roller follows the inner contour and the outer contour in such a way that the roller follows a portion of the first region of the outer contour, thereafter follows a portion of the second region of the outer contour and thereafter follows a portion of the first region of the inner contour.

2. An on-load tap-changer, the on-load tap-changer comprising:
   the motor with the output shaft, the diverter switch with the drive shaft, and the transmission as claimed in claim 1.

3. The transmission as claimed in claim 1, wherein the portion of the first region of the inner contour or the portion of the first region of the outer contour is arranged between the second region of the inner contour and the second region of the outer contour.

4. The transmission as claimed in claim 1, wherein the drive gear wheel is configured such that is does not move while the roller is following the portion of the first region of one of the inner contour or the outer contour.

5. The transmission as claimed in claim 1, wherein the drive gear wheel is configured to move while the roller is following the portion of the second region of one of the inner contour or the outer contour.

6. The transmission as claimed in claim 1, wherein the roller is arranged on a toothed element which is operatively connected to the drive gear wheel.

7. The transmission as claimed in claim 1, wherein the transmission is configured such that the drive gear wheel is operated for a switching process of the diverter switch.

8. The transmission as claimed in claim 7, wherein the transmission comprises a locking mechanism which is configured such that the locking mechanism, after operation of the drive gear wheel, prevents the drive gear wheel from being moved further.

9. The transmission as claimed in claim 8, wherein the transmission comprises a release mechanism which is configured such that the release mechanism, before operation of the drive gear wheel, releases the locking mechanism, so that the drive gear wheel is moveable.

10. The transmission as claimed in claim 9, wherein the cam disk has a third contour in which at least one follower is configured to run, and
   wherein the third contour has a first region with a constant radius of curvature and a second region in which the distance from the rotation axis of the cam disk changes.

11. The transmission as claimed in claim 10, wherein the at least one follower is configured to interact with the locking mechanism or the release mechanism such that the locking mechanism is released while the at least one follower is following a portion of the first region of the third curve, and
   wherein the locking mechanism is configured to be activated while the at least one follower is following the second region of the third curve.

12. The transmission as claimed in claim 10, wherein the locking mechanism or the release mechanism comprises at least one locking pawl, which is connected to the at least one follower, and comprises at least one projection which is arranged on the drive gear wheel.

\* \* \* \* \*